United States Patent [19]

Esu

[11] Patent Number: 5,585,438
[45] Date of Patent: Dec. 17, 1996

[54] REMELTABLE THERMOSET RESIN

[76] Inventor: Charles S. Esu, 1170 Gregerscroft Rd., Potomac, Md. 20854

[21] Appl. No.: 521,036

[22] Filed: Aug. 29, 1995

[51] Int. Cl.$^6$ .............................. C08L 61/28; C08L 31/04
[52] U.S. Cl. .......................... 525/163; 525/157; 525/518; 525/519
[58] Field of Search .................................... 525/157, 163, 525/518, 519

[56] References Cited

U.S. PATENT DOCUMENTS

| 3,458,465 | 7/1969 | Rehnelt et al. | 260/29.4 |
| 3,532,647 | 10/1970 | Ritson et al. | 260/6 |
| 4,018,966 | 4/1977 | Antlfinger et al. | 428/423 |
| 4,183,832 | 1/1980 | Meunier et al. | 260/17.3 |
| 4,245,689 | 1/1981 | Grard et al. | 162/134 |
| 4,346,127 | 8/1982 | Ruvolo et al. | 427/244 |
| 4,499,125 | 2/1985 | Blasing et al. | 428/503 |
| 4,898,696 | 2/1990 | Sliwka | 264/4.7 |
| 5,182,335 | 1/1993 | Da Ré | 525/30 |
| 5,283,266 | 1/1994 | Matsuo et al. | 523/206 |
| 5,368,803 | 11/1994 | Brow et al. | 264/257 |

FOREIGN PATENT DOCUMENTS 0082635  6/1983  European Pat. Off. .

Primary Examiner—W. Robinson H. Clark
Attorney, Agent, or Firm—Richard C. Litman

[57] ABSTRACT

Melamine thermoset resins with low formaldehyde volatiles display a remeltable solid phase, a liquid phase, and a cured solid phase. These resins are formulated from melamine, glycerol as a cross-linker, polyvinyl acetate homopolymer, and sucrose as a formaldehyde scavenger in an aqueous solvent. Optional ingredients for controlling the resin adhesive's crosslinking and/or curing rate include ethylene glycol, a pH buffering system such as citric acid/sodium diacetate, and an amine block sulfonic acid salt. The compositions are particularly useful as resins for coatings, saturations, and bonding of synthetic fibers into fabric mats; and display thermal stability and rigidity at temperatures ranging up to 370° C.

11 Claims, 2 Drawing Sheets

REMELTABLE THERMOSET RESIN

BACKGROUND OF THE INVENTION

1. Field of the Invention

The present invention relates to thermoset resins. More particularly, the present invention relates to resin compositions displaying both a remeltable phase and a cured thermoset phase.

2. Description of the Prior Art

Thermoset melamine resins are widely used in the manufacture of laminates and as coatings for fibrous nonwoven webs. Typically, these resins are formed from the aqueous copolymerization of melamine and formaldehyde in a 1:1 to 1:3.5 ratio. Though these resins have achieved great acceptance in the art, several disadvantages still persist. Among the most problematic is the high level of volatile free formaldehyde that is emitted by this resin, both in its manufacture, and in final products made therefrom. Further, the formaldehyde and melamine resin components undergo rapid cross-linking once combined, reducing their flowability and/or sprayability unless immediately used. Accordingly, processes and apparatuses utilizing this class of resin are conventionally encumbered with at site preparation of the resin, in addition to applying the resin.

Improvements in the form of additives to the basic melamine/formaldehyde system have been a constant pursuit of the prior art. U.S. Pat. No. 3,532,647, issued Oct. 6, 1970 to Daniel D. Ritson et al. describes a coating composition that includes a $<C_{18}$ sugar, such as sucrose, as an extender in a melamine-formaldehyde resin.

Polyvinyl acetate and/or glycerol have also been used in prior art melamine/formaldehyde resin systems. For example, U.S. Pat. No. 4,018,966, issued Apr. 19, 1977 to George J. Antifinger et al. describes a polymer of various vinyl compounds, such as vinyl acetate, with a hydroxyl-containing monomer copolymerizable therewith and a thermosetting resin such as melamine/formaldehyde. The hydroxyl-containing monomer may be glycerol. U.S. Pat. No. 3,458,465, issued Jul. 29, 1969 to Kurt Rehnelt et al. describes a laminate binding solution that includes polyvinyl alcohol with residual acetyl groups (such as the acetate), a polyhydric alcohol (such as glycerol), and melamine. U.S. Pat. No. 3,936,547, issued Feb. 3, 1976 to Karl Schnee et al. incidentally describes that melamine resins, urea resins, and polyvinyl acetate dispersions alone or in combination may be used in self-adherent films (See col. 1, lines 13–25) U.S. Pat. No. 4,245,689, issued Jan. 20, 1981 to Henry P. Grard et al. describes a backing web that includes a binder component of, among others, vinyl acetate and stearylated melamine emulsion.

U.S. Pat. No. 4,499,125, issued Feb. 12, 1985 to Elmer P. Blasing et al. patent describes a solid or molten melamine-formaldehyde resin that may be used in laminates. U.S. Pat. No. 5,368,803, issued Nov. 29, 1994 to Mark J. Brow et al. patent describes a method for producing melamine based resin panels with no odor and low levels of aldehyde release.

U.S. Pat. No. 4,898,696, issued Feb. 6, 1990 to Wolfgang Sliwka; U.S. Pat. No. 5,182,335, issued Jan. 26, 1993 to Mario Da Re'; U.S. Pat. No. 5,283,266, issued Feb. 1, 1994 to Satoshi Matsuo et al.; and Europe Patent Application No. 0 082 635 A1, published Jun. 29, 1983 and assigned to Appleton Papers, Inc. describe melamine encapsulation of various polymer and/or inert components.

None of the above inventions and patents, taken either singly or in combination, is seen to describe the instant invention as claimed.

SUMMARY OF THE INVENTION

The present invention relates to melamine compositions that include modifiers to produce complete resins and resin adhesives in a substantially uncured solid form. These compositions may be remelted to a flowable/sprayable fluid phase for use in various melamine application processes, hereinafter referred to as a "B" stage, prior to a final high temperature cure. The modifiers include glycerol as a crosslinker, polyvinyl acetate homopolymer, and sucrose as a formaldehyde scavenger. The compositions are particularly useful as resins for coatings, saturations, and bonding of synthetic fibers into fabric mats.

For the purposes of the present invention, a resin is "remeltable" if it may be formed in a substantially solid form which may be subsequently liquified by the application of heat. Though many polymers are known which display this property, such as most thermoplastic resins, the concept of a thermoset resin that is also remeltable is not readily achieved by the prior art.

Thermoset resins are those that cure at a particular temperature to form a rigid solid. Once cured, thermoset resins maintain their rigidity as temperature is varied. Thermosetting resins are accordingly more stable in high temperature environments, or those that include heat fluctuations. The seemingly contradictory definitions of "thermoset" and "remeltable" are reconciled by the multi-phase nature of the present resins and resin adhesives. The present resins have a first solid phase within a temperature range that ideally includes room temperature, a liquid phase, and a second solid phase, as temperature is increased. The transition between the liquid phase and the second solid phase is thermosetting. Accordingly, the present resins are particularly useful in the manufacture of goods in which a thermoset resin is desired, but a flowable stage is advantageous, such as in a laminate, adhesive, or cast material, since the resin components are conveniently provided together in solid form and simply remelted, rather than having to be combined in situ.

A further advantage of the present resin formulations is the substantial displacement of formaldehyde as a reactant in melamine type resins. The concentration of formaldehyde and melamine in conventional melamine-formaldehyde resins are typically equimolar, or have an excess of formaldehyde. In these prior art resins the sharp odor of toxic formaldehyde volatiles is quite clearly evident to olfaction, unless masked by perfumes or other odor neutralizing agents. It has been surprisingly found that polyvinyl acetate homopolymer may be used to substantially replace formaldehyde in the resin system. Though the present resins may contain a small amount of formaldehyde in the starting melamine component, no additional formaldehyde is added. Accordingly, the objectionable formaldehyde volatiles are substantially reduced to a fraction of conventional melamine-formaldehyde resins. The addition of glycerol and sucrose serves to further reduce these emissions by binding up remaining free volatiles into the polymer matrix and/or reacting with formaldehyde moieties to produce less volatile cyclic and polymeric formals.

Optional ingredients may be advantageously incorporated to further enhance the present formulations for a variety of desired performance criteria by controlling the resin adhesive's crosslinking and/or curing rate. Exemplary among these are organic solvents such as ethylene glycol, a pH buffering system such as citric acid/sodium diacetate, and an amine block sulfonic acid salt.

Accordingly, it is a principal object of the invention to provide dried compounded melamine thermoset resins and resin adhesives that may be re-melted at low to medium temperatures for use in producing molded, laminated, nonwoven fiber, and/or roll goods, and subsequently high temperature cured to produce durable products.

It is another object of the invention to provide remeltable resins with greater flowability/sprayability at a "B" Stage.

It is a further object of the invention to provide improved melamine type resins that include advantageously low amounts of formaldehyde volatiles, and good high temperature stability.

Still another object of the invention is to simplify the manufacture of thermoset goods by providing all necessary resin components together in easily handled liquid or solid forms.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
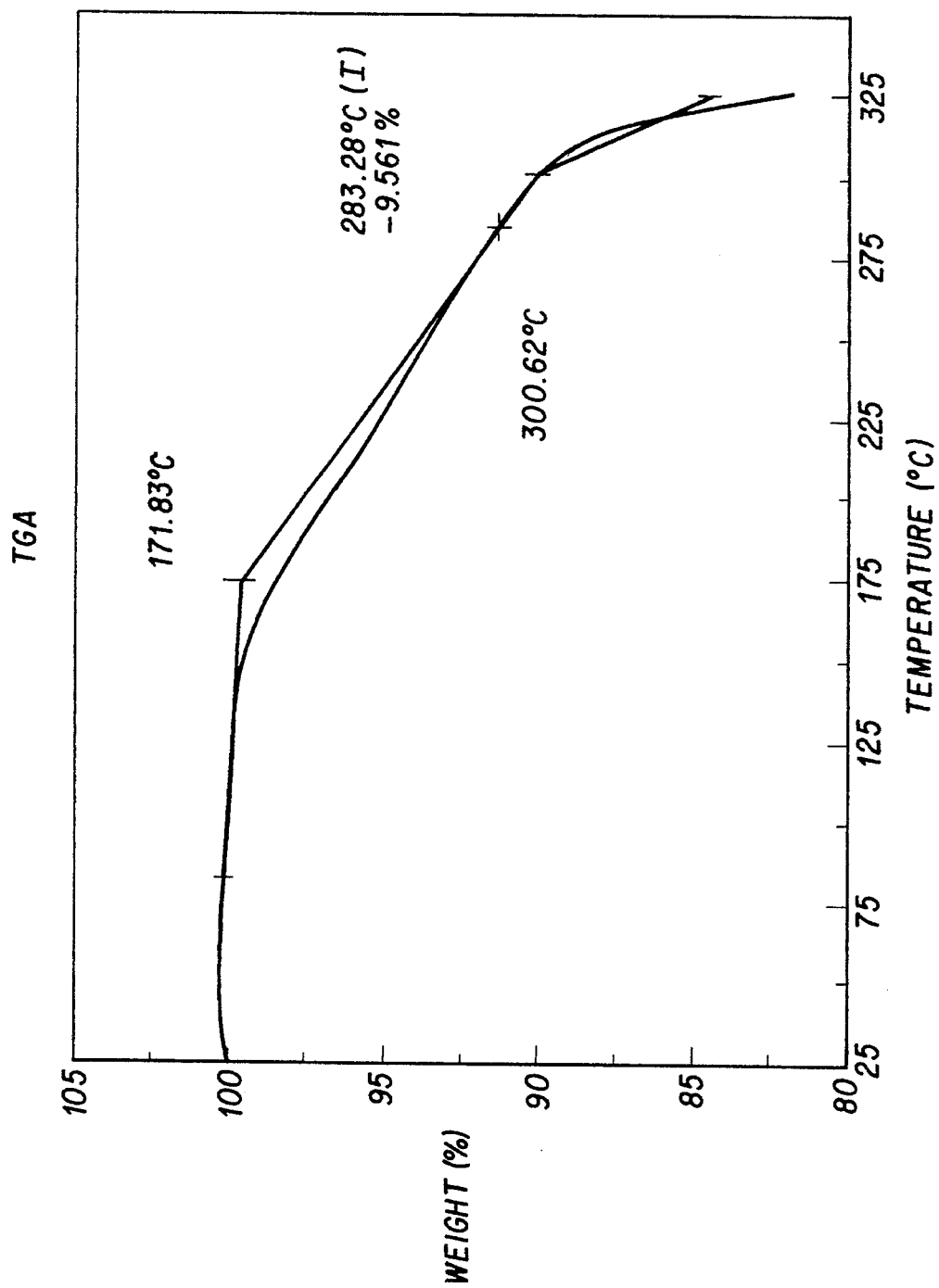
FIG. 1 is a graph displaying the performance of a resin according to the present invention under Thermal Gravitational Analysis (TGA).

The present invention relate to waterborne resin compositions that include as reaction components: melamine, polyvinyl acetate homopolymer, sucrose, and glycerol.

The melamine component is an alkylated melamine-formaldehyde resin which may be in any commercially available form. Preferably, a melamine solution such as Permafresh Mel-80 from Sequa Chemicals or Mel-30 from Borden Chemicals is used. The polyvinyl acetate homopolymer used is substantially self polymerized, preferably in a thickened fluid form. This may be distinguished from vinyl acetate copolymers typically used in which individual or small collections of vinyl acetate is crosslinked with disparate prepolymers. Further, the homopolymer is substantially nontoxic and nonvolatile, whereas vinyl acetate is a well known volatile hazardous material. Commercially available cold adhesive polyvinyl acetate products, such as Elmer's Glue, may be employed in the present invention. The glycerol component may be supplied as the base compound, or as the oleate. Glycerol monooleate kosher is preferred. Sucrose is preferably (+)-sucrose.

The resin composition is preferably prepared from about 60–100 parts by weight melamine formaldehyde resin, 30–60 parts polyvinyl acetate, 35–60 parts (+)-sucrose, 0.3–10 parts by weight glycerol monooleate kosher, and from about 2–50 parts water or a combination of water and an organic solvent, wherein all parts by weight are based on the total weight of the resin composition. A particularly preferred formulation includes:

| Reactant | Parts by Weight |
| --- | --- |
| Permafresh Mel-80 (melamine resin) | 70 |
| Elmer's Glue (polyvinyl acetate) | 30 |
| (+)-sucrose | 60 |
| glycerol monooleate kosher | 05 |
| water/organic solvent | 05 |

The selection of a solvent may be used to control the resin adhesive's crosslinking rate, curing rate and/or to modify the resin's final characteristics. Ethylene glycol increases the drying and curing rate. For some applications, a high solids content is desired. To this end, ethylene glycol may be also be used as a solvent in place of water in the above formulations to provide greater rigidity.

Besides water and/or ethylene glycol, other solvents or solvent combinations may be employed such as glycol ether, glycol ether ester, ethanol, propanol, butanol, aromatic hydrocarbons, and aliphatic hydrocarbons. Preferably, these organic solvents are water soluble, and have a higher boiling point than water to allow delay in resin crosslinking during cure. Particularly preferred solvents include ethylene glycol monobutyl ether and diethylene glycol monobutyl ether, which have boiling points of 171.2° C. and 230° C., respectively. These particular solvents also have evaporation rates that assist in the drying of the resin.

Most commercially available melamine formaldehyde resins, including Permafresh Mel-80, include a small amount of free formaldehyde, e.g. about 4%. The addition of sugars such as sucrose absorbs and/or consumes a portion of the free formaldehyde and also serves as a humectant. Sugars react with free formaldehyde very much like smaller hydroxyl containing molecules and form both hemiacetals and stable methylene ethers. Up to 5 moles of free formaldehyde can be absorbed by each mole of sugar added.

Glycerol reacts with the remaining free formaldehyde, forming both cyclic and polymeric formals. The reaction between formaldehyde and glycerol may be represented by the following formulas:

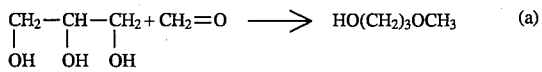  (a)

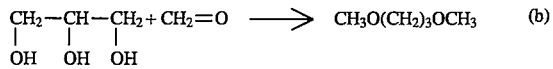  (b)

These reactions occur simultaneously at neutral pH. The first reaction (a) predominates in basic environments, and the second (b) in acidic ones. Further, under heat and in the presence of an optional acid catalyst, cyclic glycerol formals are formed:

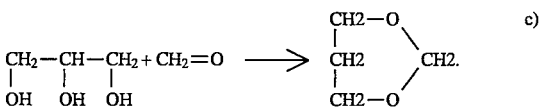  c)

The acid catalyst may be selected from any strong proton donor, such as $H_2SO_4$ or HCl. Preferably, the acid catalyst also includes sulfonic acid. An amine-block type sulfonic acid such as NACURE 3525 from King Industries is a particularly desirable additive. Amine block sulfonic acids, besides catalyzing the consumption of formaldehyde, also mediate curing of the present resins by blocking the amino functionalities of melamine outside a desired temperature range. Nacure 3525, for example, limits crosslinking of amine functionalities to a temperature from about 120° to 200° C. The present resin without such an additive has a curing temperature of from about 175° to 260° C. Therefore, use of this particular additive limits curing to an effective range of from about 175° to 200° C. Other sulfonic acid formulations may be advantageously selected for different curing temperature ranges as desired. This additive also provides other desirable properties to the final thermoset product, including: improved adhesion, salt spray resistance, water resistance, and wrinkling resistance in high solid coatings.

Other optional ingredients which may be advantageously used in the present invention include pH buffering agents such as citric acid/sodium diacetate. Preferably the buffering agents are provided at a concentration of from 0.01 to 1.8 percent by weight of the resin acid catalyst. As noted above, there are two reaction pathways for the conversion of formaldehyde, both of which are active at neutral pH. It has been found that when this neutrality is maintained in the 7 to 7.4 range, the formaldehyde conversion rate may be substantially increased, leading to less volatiles in the final product.

In formulating this composition, a sugar solution is prepared from (+)-sucrose and glycerol monooleate in water, with or without an organic solvent, and with constant stirring, heated to liquify. Alternatively, sucrose may be heat melted prior to combining with glycerol and any solvents. The polyvinyl acetate homopolymer is then introduced and mixed to form a homogenous fluid phase or slurry. The resin mixture thus formed is substantially free from volatile formaldehyde and its characteristically sharp odor.

The fluid phase of the resin mixture may be advantageously and reversibly converted to a first substantially solid phase. To this end, the slurry is placed in a cast vessel and dried, preferably in an oven at 90°–105° C. for sufficient time to dewater the slurry, typically 1–3 hours. The adducts formed are then removed from the oven and cooled. The resin mixtures may be easily handled, transported and/or stored in either the fluid or substantially solid phases. To use the solid form of the present resin mixture, the solid is reheated at up to 150° C. to reproduce the fluid phase.

The fluid phase displays excellent resin-resin binding, resin-substrate binding, smooth flow through bonding sites, and good flexibility for formation of product shapes in any "B" stage process. It should be understood that the fluid phase and the first solid phase may be reversibly converted, one to the other.

The "B" stage processes for which the present resins are useful include coatings and saturations such as needlepunched, airlay, spunlace, spunbounded, meltblown, and carding processes. Particularly useful products that may be made utilizing the present resins are postformable moldings and laminates, in which a thermoset cure is desired in a second solid form, but in which flexibility and castability is desired in a first solid form. To cure the present resin mixture in these products, temperature is raised to from about 175°–260° C. to form a thermoset. The cured resin thermoset displays high softening temperatures (Tg °C.) and excellent weight loss resistance, and is ideal for applications that require thermostable rigidity.

EXAMPLE 1

Step 1: In a 500 ml beaker, 70 g of Permafresh Mel-80, a melamine solution, were mixed with 30 g of polyvinyl acetate homopolymer, 0.2 g of glycerol monooleate kosher, and a sugar solution containing 30 g of (+)-sucrose and 30 g of tap water. The mixture was stirred for approximately 5 min. to achieve a homogeneous solution.

Step 2: 10 g samples of this mixture was placed in an aluminum pan and dried in an oven at 90°–105° C. for 70–90 minutes to produce a dried solid. The dried samples remained stable when cooled to room temperature.

Step 3: These dried samples from Example 1 were placed on hot plates, set to heat the samples to increments from 105° to 150° C. Each sample melted within a matter of a few seconds to a smoothly flowable liquid.

Step 4: The temperature of each of the hot plates was again raised to a temperature between about 175° to 260° C. A thermoset cure was achieved in each sample.

EXAMPLE 2

Step 1: 35 g, 45 g, and 55 g portions of (+)-sucrose solid were introduced into individual 250 ml glass beakers. Each of the beakers was placed on a hot plate, and melted to liquify. 70 g of Permafresh Mel-80 in aqueous solution was added under stirring to each of these hot sugar melts, followed by 30 g of polyvinyl acetate homopolymer, 0.5 g of glycerol monooleate kosher, and 0.5 g ethylene glycol. The mixture obtained was stirred for 5 minutes to obtain a homogeneous solution.

Step 2: 10 g samples of each solution was dried to a solid phase in an aluminum pan in a vacuum oven at 125° C. until substantially dewatered, which occurring within 1 to 2 hours for each sample.

Step 3: 5 g of each dried solid was placed on a hot plate set to 150° C. Within a few seconds these solids remelted to solution form.

Step 4: The temperature of each solution was raised to 260° C. The sample from the original 35 g sucrose mixture cured within a few minutes. The temperature was raised to 300° C., at which point the 45 g and 55 g sucrose mixtures cured readily with a few minutes.

EXAMPLE 3

Example 2 was repeated with 55 g of (+)-sucrose and the addition of 0.5 g of NACURE 3525 to the solution. The resin was found to remelt at the same temperature as the 55 g sucrose sample of Example 2. Multiple samples of this remelted liquid were raised to temperatures between 177° and 204° C. Curing occurred in each case within 2 minutes.

The high viscosity solutions obtained after step 1 in Examples 1 through 3 were observed to have a sweet odor. This may be attributed to the sugar and glycerol monooleate components, which may be conventionally found in food mixes, bakery goods, margarines, convenience foods, and frozen desserts. No free formaldehyde odor was observed after step 1 or step 2 in each example. As shown in Example 2, the level of sugar may be correlated with the curing temperature. As shown in Example 3, this curing temperature may be significantly depressed with amine block sulfonic acids.

Comparative Example

For comparison, samples were prepared according to Example 1, without the glycerol component. The samples dried to substantially solid form. However, upon atmospheric exposure, the samples became tacky and showed swelling from absorbed water.

EXAMPLE 4

The thermal stability of the cured melamine/polyvinyl acetate/sucrose/glycerol resin was assessed using the thermal gravitational analysis (TGA) method. A 15.689 mg sample was prepared according to Examples 1 above. The resin was cured in an oven for 2 hours to produce a thermoset, and the cured mass was measured to determine a base weight. The temperature of the sample was gradually raised from 25° C. to 325° C. and the weight as a percentage of base weight was monitored. The results are seen in FIG. 1. The present resin showed substantially no loss of mass up to 171.63° C., and had a shallow decomposition curve through 300° C., at which point 90% of the mass was still conserved.

EXAMPLE 5

Figure 2:
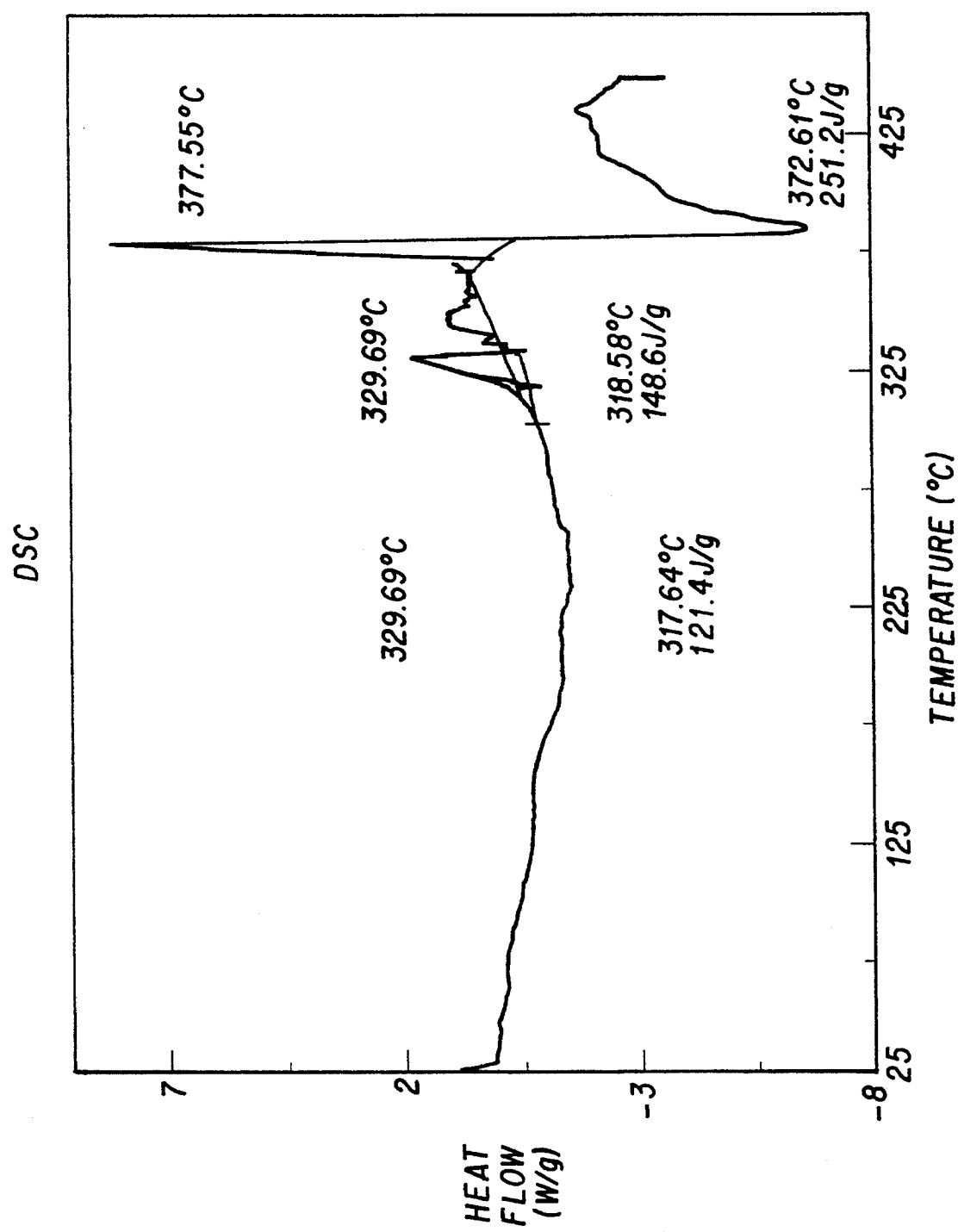
FIG. 2 is a graph displaying the performance of this resin in a Differential Scanning Calorimetry (DSC) test.

A 10.74 mg. sample was prepared according to Example 1 above and cured in an oven for 2 hours to produce a thermoset. The sample was analyzed for thermal rigidity using differential scanning calorimetry (DSC) in which heat absorption at various temperatures is measured as a function of electric current flow through a heater element. A spike in the heat flow indicates a transition temperature. As seen in FIG. 2, rigidity of the resin is well maintained up to a first transition at from about 318° C. to about 330° C. The beginning of this transition corresponds to the softening temperature ($T_g$ °C.) A second transition occurring between about 372° and 377° C. corresponds to the melting point ($T_m$).

EXAMPLE 6

A remeltable resin mixture was applied in the Modigliani process for producing postformable nonwoven fiberglass mats.

Glass was introduced into a furnace at 1200° C. and melted to form a slurry. The melted glass slurry was dripped through a spineret from a bushing plate to form cooling fiberglass strands. These strands were wound on a revolving drum while sprayed with a liquid phase resin solution as prepared in Example 1, step 1. As the strands were wound over themselves, the resin solution flowed easily through the fibers and displayed excellent substrate bonding. The fibers were layered to standard thicknesses and cut off the drum. The resultant mat was then stretched on an expansion table to produce a web which was subsequently dried in an oven at about 100° to 150° C., cooled, and wound into rolls. This web product had pore sizes from about 0.2 to 2 microns and was suitable for use as postformable non-woven fabric in fiberglass applications, displaying excellent resin-resin binding upon curing. The non-woven fabric may be formed into the desired configuration by remelting the dried resin. Once the desired configuration is produced, the fabric is cured to thermoset.

It is to be understood that the present invention is not limited to the embodiments described above, but encompasses any and all embodiments within the scope of the following claims.

I claim:

1. A remeltable thermoset resin composition consisting essentially of about 60–100 parts by weight of a melamine-formaldehyde resin, wherein said melamine-formaldehyde resin is the reaction product of reactams consisting of melamine and formaldehyde, 30–60 parts by weight polyvinyl acetate homopolymer, 35–60 parts by weight sucrose, 0.3–10 parts by weight of a glycerol, and 2–50 parts by weight of an aqueous solvent, wherein all parts by weight are based on the total weight of the thermoset resin composition; said resin composition characterized by having a first remeltable solid phase, a liquid phase upon heating, and a second thermoset solid phase upon further heating.

2. The resin composition according to claim 1 consisting of 70 parts by weight melamine-formaldehyde resin; 30 parts by weight polyvinyl acetate homopolymer, 60 parts by weight sucrose, 5 parts by weight glycerol, and 5 parts by weight of an aqueous solvent.

3. The resin composition according to claim 1, wherein said polyvinyl acetate homopolymer is in a thickened fluid form.

4. The resin composition according to claim 1, wherein said glycerol is glycerol monooleate kosher.

5. The resin composition according to claim 1, wherein said sucrose is (+)-sucrose.

6. The resin composition according to claim 1, wherein said aqueous solvent, in addition to water, contains an organic solvent selected from the group consisting of ethylene glycol, a glycol ether, a glycol ether ester, ethanol, aromatic hydrocarbons, aliphatic hydrocarbons, and combinations thereof.

7. The resin composition according to claim 6, wherein said organic solvent is selected from the group consisting of ethylene glycol, ethylene glycol monobutyl ether, and diethylene glycol monobutyl ether.

8. The resin composition according to claim 1, further comprising an acid catalyst.

9. The resin composition according to claim 8, wherein said acid catalyst includes an amine block sulfonic acid.

10. The resin composition according to claim 8, wherein said acid catalyst includes pH buffering agents.

11. The resin composition according to claim 10, wherein said pH buffering agents are citric acid and sodium diacetate.

* * * * *